Sept. 27, 1966  C. D. MacCRACKEN  3,274,990
MASS-PRODUCTION LOW-COST FURNACE FOR SUPPLYING
HIGH-TEMPERATURE HIGH-VELOCITY AIR
FOR DOMESTIC HEATING
Filed Aug. 12, 1964  4 Sheets-Sheet 1

INVENTOR
CALVIN D. MacCRACKEN
BY
Robertson, Smyth & Bryan
ATTORNEYS

Sept. 27, 1966　　　C. D. MacCRACKEN　　　3,274,990
MASS-PRODUCTION LOW-COST FURNACE FOR SUPPLYING
HIGH-TEMPERATURE HIGH-VELOCITY AIR
FOR DOMESTIC HEATING
Filed Aug. 12, 1964　　　　　　　　　　4 Sheets-Sheet 2
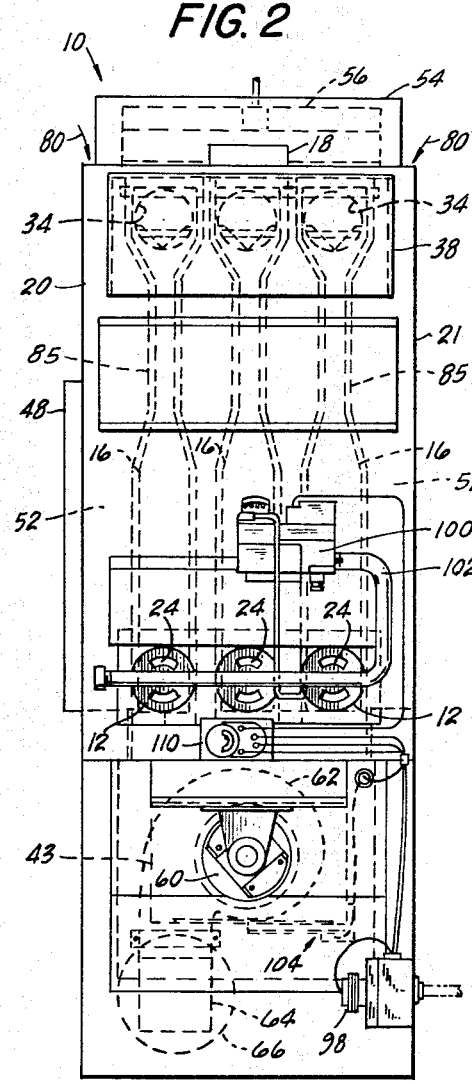
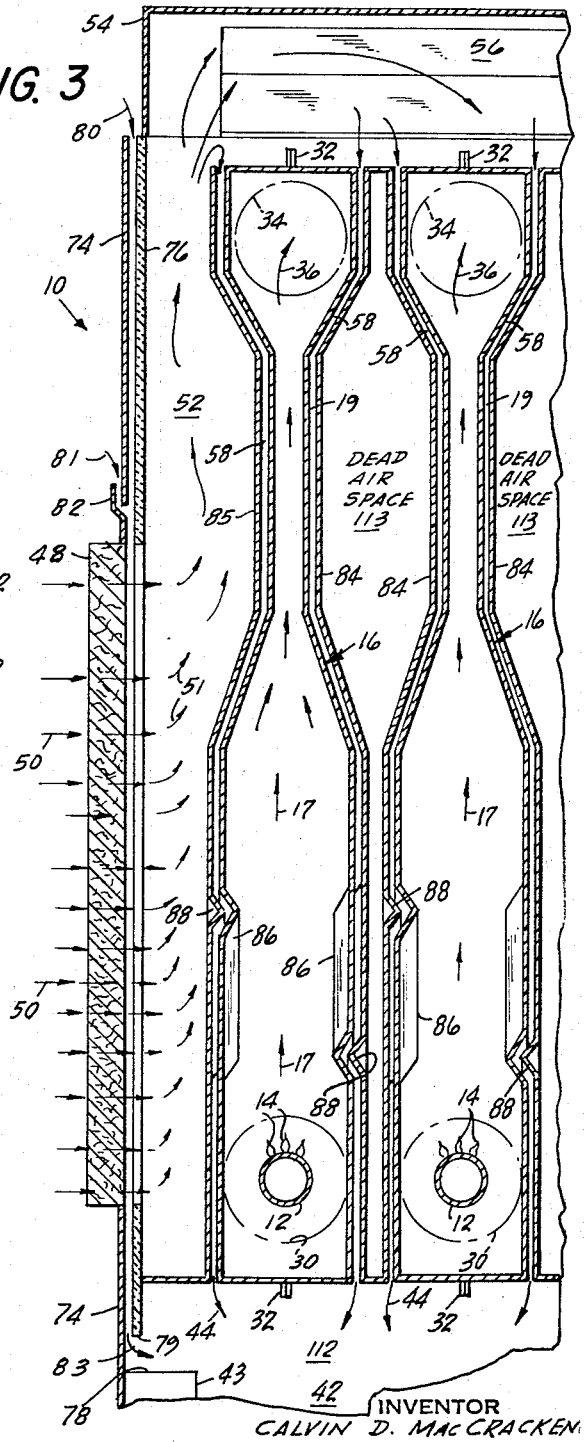
INVENTOR
CALVIN D. MacCRACKEN
BY
Robertson, Smythe & Bryan
ATTORNEYS Sept. 27, 1966　　　C. D. MacCRACKEN　　　3,274,990
MASS-PRODUCTION LOW-COST FURNACE FOR SUPPLYING
HIGH-TEMPERATURE HIGH-VELOCITY AIR
FOR DOMESTIC HEATING
Filed Aug. 12, 1964　　　　　　　　　　　　4 Sheets-Sheet 3

INVENTOR
CALVIN D. MacCRACKEN
BY
Robertson, Smythe & Bryan
ATTORNEYS

Sept. 27, 1966  C. D. MacCRACKEN  3,274,990
MASS-PRODUCTION LOW-COST FURNACE FOR SUPPLYING
HIGH-TEMPERATURE HIGH-VELOCITY AIR
FOR DOMESTIC HEATING
Filed Aug. 12, 1964  4 Sheets-Sheet 4

INVENTOR
CALVIN D. MacCRACKEN
BY
Robertson, Smythe + Bryan
ATTORNEYS

United States Patent Office 3,274,990
Patented Sept. 27, 1966

3,274,990
MASS-PRODUCTION LOW-COST FURNACE FOR SUPPLYING HIGH-TEMPERATURE HIGH-VELOCITY AIR FOR DOMESTIC HEATING
Calvin D. MacCracken, Tenafly, N.J., assignor, by mesne assignments, to Calmac Corporation, Boston, Mass., a corporation of Massachusetts
Filed Aug. 12, 1964, Ser. No. 389,121
12 Claims. (Cl. 126—110)

The present invention relates to a hot air home heating furnace and more particularly to a mass-production low-cost furnace for supplying high-temperature, high-velocity air for home heating.

There are two basic types of systems available today utilizing heated air for domestic heating. One of these systems, which is the common one now in widespread use, utilizes a relatively large volume of slow moving air at moderate temperature, i.e., in the range from 100° F. to 200° F. This first system is referred to herein as the low-velocity, low-temperature and large volume system or for convenience as the low-velocity, low-temperature system. The second system, which is in limited use now in competition with the first one utilizes a small volume of high velociy air at high temperature, i.e., in the range from 250° F. to 350° F. This second system is referred to herein as the high-velocity, high-temperature and small volume system. In the low-velocity, low-temperature system the warm air is distributed from the furnace to the individual rooms through large bulky sheet metal supply ducts with numerous branch passages. Also, the volume of moderate temperature air being fed to the rooms is so large that it is customary to install a second set of large ducts to return air from the rooms back to the furnace.

In the high-velocity, high-temperature domestic system the warm air is distributed from the furnace to the rooms through small round insulated flexible ducts which have an over-all outside diameter including their insulation which is less than the 3 and 5/8 inch spacing within a common 2 x 4 inch stud-construction wall. The small volume of hot air being supplied to the rooms is sufficiently small that return flow to the furnace is accommodated by the clearance around and beneath doors. In operation this small volume of hot air is mixed with room air so as to provide a much larger volume of moderate temperature air which is introduced into the room.

The advantages of the high-velocity, high-temperature system result from the ease of installation, for the small, flexible ducts can be pulled through wall spaces and bent around corners as compared with the laborious cutting and fitting required for installation of large sheet metal ducts. The high-velocity, high temperature system eliminates the need for a return duct system. There is a marked saving in space in and around the furnace and in the cellar or in the slab foundation, in the walls, attic or crawl space, wherever the duct system extends, as compared with the space consumed by the large trunkline supply and return ducts and branch ducts in a common low-velocity, low temperature system. Moreover, the small flexible ducts are insulated and contain only a relatively small amount of air and structural materials as compared with the large sheet metal ducts. The insulation retains substantial warmth within the small ducts for an hour or more. Thus, when the furnace starts firing, there is very little or at most only a small thermal mass to be re-heated before the warm air reaches the rooms; whereas, in a common system there is a substantial length of time before the warm air from the furnace can re-heat the relatively massive cold ducts. Thus, there are numerous advantages of convenience of installation, savings in space, efficiency, and reduced cost of the distribution ducts in the high velocity and temperature system. However, one factor has overbalanced all of these advantages for almost all installations in which the two systems have been considered competitively. This one factor has been the much higher cost and marked complexity of high-velocity, high-temperature furnaces of the type known in the prior art. The various agencies which test furnaces to assure their safety for home use require that the outer casing of the furnace must remain below certain temperature limits under all conditions of operation, even in spite of blower failures or abrupt furnace shut off. The prior high-velocity temperature furnaces have required elaborate and complex heat exchanger construction and blower arrangements to assure that the safe outer casing temperature limits were not exceeded.

Among the many advantages of the present invention are those resulting from the fact that it enables the use of a modified conventional low-velocity, low-temperature domestic furnace to generate high-temperature, high-velocity air. Thus, the furnace is already in mass production, being widely used in the common system, and the present invention enables this conventional furnace to be used but nevertheless maintains the outer jacket temperature below the required limits while avoiding the complexity and expense of prior-art high-velocity, high-temperature systems. Consequently, for the first time, the present invention provides a safe, economical furnace which places the high-velocity, high temperature small flexible duct home heating system in a favorable competitive position with respect to the common low-temperature, low velocity, large bulky duct system.

Additional advantages result from the fact that the furnace of the present invention is adapted to be gas-fired or oil-fired. Moreover, the furnace is adapted to supply domestic hot water.

In this specification and in the accompanying drawings are described and shown a mass-production low-cost furnace for supplying high-termperature, high-velocity air for home heating as an embodiment of the present invention and various modifications thereof are indicated, but it is to be understood that these examples are given for purposes of illustration and are not intended to be exhaustive nor limiting of the invention. These examples are set forth in order that others skilled in the art may fully understand the invention and the manner of utilizing the invention in various particular installations.

The various objects, aspects and advantages of the present invention will be more fully understood from a consideration of the following description in conjunction with the accompanying drawings, in which:

FIGURE 2 is a front elevational view of the furnace of FIGURE 1;

FIGURE 3 is a partial sectional view taken along the line 3-3 of FIGURE 1 and showing the heating units and baffles on enlarged scale;

Figure 1:
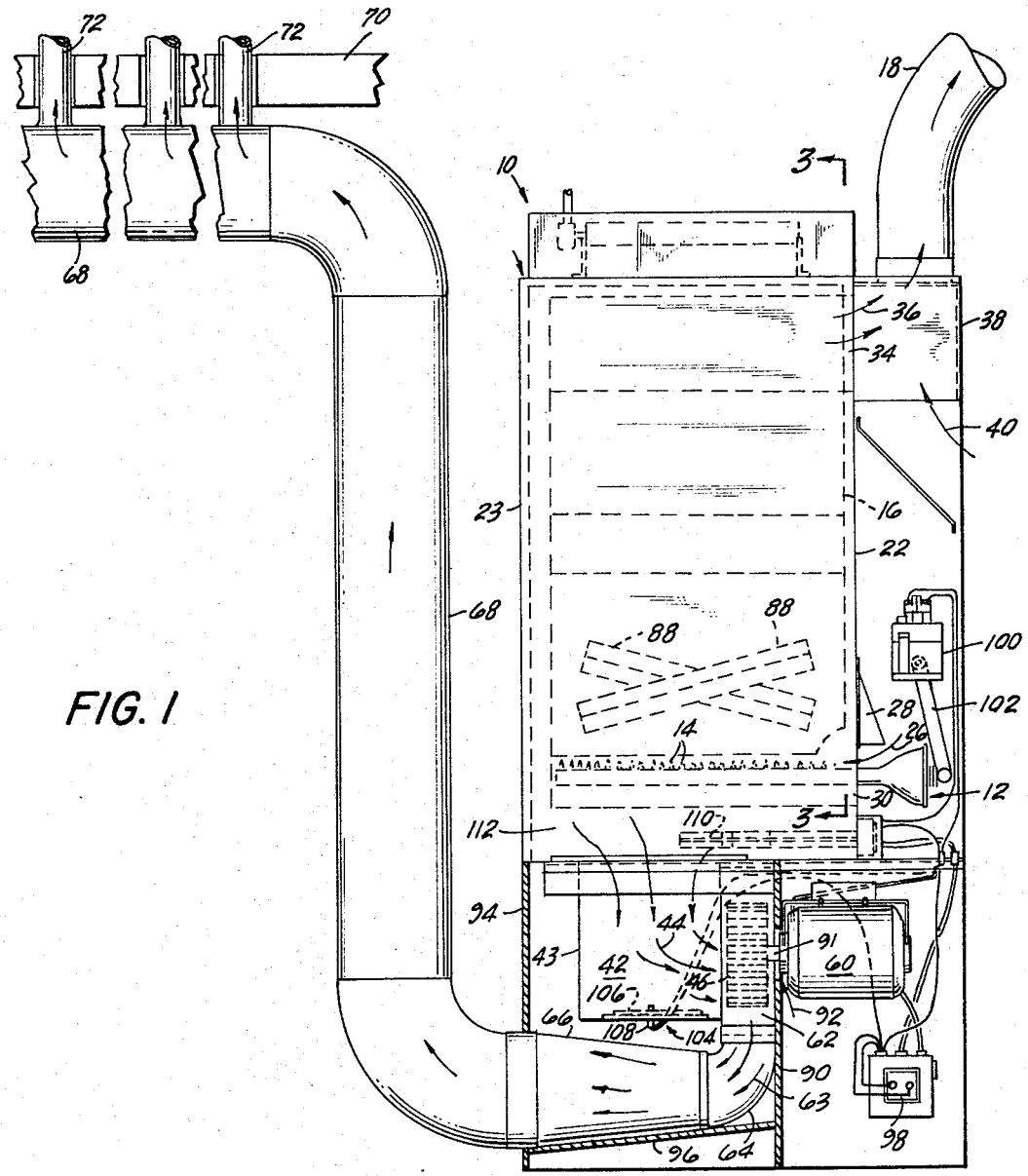
FIGURE 1 is a side elevational view of a gas-fired furnace and high-velocity duct distribution installation embodying the present invention for supplying air at a temperature in the range from 250° to 350° and at high velocity for home heating, with certain parts being broken away or shown in section for clarity of illustration.

As shown in FIGURES 1, 2 and 3, the conventional components of the furnace 10 are the gas-burner elements 12 for producing the flames 14, the heat-exchanger cells 16 for containing and conducting the hot combustion gases 17 up to the flue 18, and the furnace jacket side walls 20, 21, front wall 22 and rear wall 23. The heat-exchanger cells 16 include intermediate throat sections 19 of reduced width as compared with their lower ends and upper ends, as is conventional. The remaining parts of the furnace and their relationship and cooperative function interaction are novel so as to provide high-temperature, high-velocity air for home heating while avoiding over-heating of the conventional furnace components and while maintaining the outer casing walls 20–23 below required limits.

This furnace 10 is shown as including three gas-burner elements 12 and three heat-exchanger cells 16, which provide adequate heating capacity for most homes. In the cases where less heat capacity is desired, then only two of the burners 12 and two cells 16 may be used. The burner elements 12 are conventional cast-iron, drilled port gas burners and produce a multitude of small blue flames 14. The primary air for mixing with the gas enters into the burner elements 12 through adjustable openings 24 in the front end of the burner elements, and the combustion air 26 (FIGURE 1) flows by natural draft into each heat-exchange cell by entering under a front hood 28 and passing in through an air inlet opening 30 around the shank of each burner 12. The cells 16 are of conventional construction and include two identical formed sheet metal halves which are welded together all along their flanges 32 (FIGURE 3) so that each of these cells 16 is totally enclosed except for the circular combustion air inlet port at 30 and a circular exhaust port at 34 which pours the exhaust gas flow 36 into a draft diverter box 38 connected to the flue 18. The bottom of the draft diverter box 38 is open to admit exhaust diluting air 40 by natural draft, as is conventional.

In order to heat the air for home heating to high temperature and to supply it at high velocity, while assuring that the temperature of the conventional furnace components and that the furnace casing walls 20–23 remain below required limits, a suction plenum chamber 42 defined by a metal box 43 is positioned in the furnace directly below the burners 12 and cells 16 and the controls are arranged so that high-temperature air 44 is drawn directly into a high speed blower wheel 46. Consequently, the ambient air to be heated is drawn into the furnace 10 and the blower wheel 46 is exposed to the high-temperature air after it has been heated so as to propel this hot air into the various room supply ducts as will be explained. The air-heating spaces within the furnace are thus operated at a pressure which is below atmospheric pressure, and all leakage spaces in the furnace walls 20–23 are purposefully connected into the suction plenum chamber 42 so that ambient air, which is cool relative to the high-temperature air being produced, is drawn into the furnace walls through these leakage spaces. Accordingly, the casing walls and operating parts continuously being cooled by this leakage inflow during operation so as to maintain their temperature below the required limits. The ambient air 50 to be heated is drawn into the furnace 10 through a filter 48 which may be located in an opening in either side wall 20 or 21, depending upon the most convenient position for the furnace installation. The filtered air 51 flows up through a side intake chamber 52 into a top heat trap and radiation box 54 containing a humidifier 56. The purpose of this heat trap and radiation box 54 will be explained further below. The air is drawn down at high velocity through several narrow heating passages 58 in parallel flow relationship in which it is heated to a high temperature, and then the resulting hot air 44 is drawn down into the suction plenum chamber 42.

As shown in FIGURE 1, the hot air 44 in the suction plenum 42 is drawn into the centrifugal drum-type blower wheel 46 driven by a motor 60. The hot air is impelled out through the blades of the blower wheel 46 and into an expanding scroll section 62 and the high-temperature, high-velocity air 63 rushes down through an elbow 64 and rearwardly into an expanding transition conduit 66 which is connected at the bottom of the back wall 23 of the furnace, as shown in FIGURE 1, to an extended insulated distribution plenum duct 68. This distribution plenum duct 68 has a substantial inner diameter in the range from 6 inches to 10 inches and has a heavy layer of insulation such as a glass fiber blanket one inch thick. This distribution plenum duct 68 is shown as mounted just beneath the first floor 70 of a house, and the individual, small-diameter insulated flexible supply ducts 72 are connected at spaced points to the distribution plenum 68 and run up through the walls of the house to respective hot air outlets on the first and second floor, as the case may be. The velocity of the hot air in these small flexible ducts 72 is above 1,000 feet per minute, and the hot air is at a temperature in the range from 240° F. to 340° F.

In order to explain the manner in which the jacket walls 20–23 are maintained below the required temperature limits, attention is directed to FIGURE 3 showing that each wall includes an outer sheet metal covering 74 and an inner layer 76 of thermal insulation, for example, such as a rigid panel of glass fiber lined with aluminium foil, said layer 76 being shown spaced a slight distance from the metal covering 74. The outer covering 74 is connected to a bottom panel 78 and the insulation layer 76 terminates at 79 above the level of the panel 78. Thus, the space between the metal covering 74 and insulation layer 76 communicates with the suction plenum chamber 42. Also, the top casing 54 joins with the insulation layer 76 and not with the metal covering 74. As shown in FIGURE 3 by the flow arrow 80, the relatively cool ambient air is drawn down around the top 54 between the covering 74 and insulation layer 76, and additional cooling air is drawn in at 81 through the naturally occurring joints 82 in the metal covering, and all of this cooling leakage air 83 is drawn into the suction plenum chamber 42. The insulation layer 76 may have a fibrous or woolly texture on its outer surface as occurs in glass fiber insulation so that there is an effective flow space adjacent to the inner surface of the covering 74 even though some of the insulation fibers may touch this covering, the flow space occurring through the porosity between these fibers.

To provide the high-temperature, high-velocity air, special contoured baffles 84 are mounted closely adjacent to the surfaces of the heat exchange cells 16 so as to define the narrow spaces 58 which have a width in the range from $\frac{5}{32}$ to $\frac{11}{16}$ of an inch. This narrow spacing is used in order to provide the desired high temperature air at the blower input in the range from 250° F. to 350° F. These baffles 84 entirely close off the flow space within the casing walls 20–23 surrounding the cells 16 except for the narrow passages 58. The two side baffles 85 are open at the top so as to provide the intake chamber 52, and the intake air flow through the filter 48 helps to cool off this one furnace wall 20 or 21, as the case may be. The cells 16 include oblique indentations 86 to provide more uniform distribution of the combustion gases 17, and the baffles 84 and 85 include pieces 88 welded thereto which extend into these oblique indentations to maintain the desired spacing, thus providing the desired high speed flow and avoiding any hot spots in the cells 16.

Advantageously, the blower motor 60 does not overheat even though the blower wheel 46 is immersed within the hot air 44. The scroll 62 has a layer of insulation 90 on the side toward the motor 60, and these is a relatively large clearance opening around the extending end of the motor shaft 91 which is connected to the blower wheel 46. Thus, there is a substantial flow 92 of cooling air along the surface of the insulation 90 around the motor 60 and along the shaft 91 so as to keep it cool. An insulation layer 94 extends behind the plenum box 43 and a layer 96 beneath the transition conduit 66.

The control system is advantageously arranged to start the blower 46 at the moment when the furnace is turned on. In many conventional warm-air furnaces the blower does not start until after the furnace has reached operating temperature to assure that maximum heating action is available when the warm air is started through the large cold sheet metal ducts so as to bring the ducts up to temperature, but in this system the extended plenum 68 and ducts 72 are insulated and hold their heat for a relatively long time. They have very little thermal mass, so that even if they have become cool after a protracted shutdown, they quickly warm up.

The control system includes a 24-volt step-down transformer 98 which is energized from the alternating-current house mains. This low secondary voltage of this transformer is connected to a solenoid gas valve 100, having a gas manifold 102 extending to the burners 12. In order to make certain that the blower wheel 46 is operating whenever the furnace is being fired, there is a suction sensing switch 104 mounted in the wall of the suction plenum box 43. This switch includes a large-area flexible diaphragm 106 and a switch 108 in series with the solenoid valve. This switch 108 is closed by deflection of the diaphragm 106 in response to the differential between atmospheric pressure and the reduced pressure in the plenum chamber 42. The switch 108 must remain closed during operation, otherwise the valve 100 becomes closed to shut off the fuel.

A temperature sensing limit control 110 extends into the region 112 beneath the lower ends of the narrow air heating spaces 58 and the top of the suction plenum. This control 110 is set so as to shut off the furnace when the hot air 44 in the region 112 at the intake to the plenum 42 is sensed to exceed a temperature of 340°.

From the above discussion it will be understood that the blower motor 60 is turned on whenever the burners 12 are operating. The suction switch 104 gives positive indication that the blower wheel 46 is operating properly. The low thermal mass of the distribution system 68, 72 and the small amount of air resident therein permits the blower to be turned on at the same time as the furnace is turned on, because even under the most severe conditions the extended plenum 68 and ducts 72 quickly warm up. Thus, the occupants of the house do not feel any significant cold drafts upon furnace start up. As a result, the control system for the furnace may be correspondingly simplified.

In the furnace of this invention the heat exchange cells 16 have portions near the burners 12 which are at a temperature of approximately 750° F. The special contoured baffles 84, 85 are essential elements to block off the major remaining space within the furnace 10, creating large dead air spaces 113 and intake passages 52, thus forcing the inflowing air 51 to rush down in parallel flow relationship through the narrow spaces 58. Also, this down flow of the air to be heated against its natural tendency to rise is an essential limitation of this furnace 10 to assure that the upper portions of the cells 16 are cooled by the inflowing air so as to maintain the exhaust gases 36 below the required limits for entering the flue.

The safety purpose of the heat trap and radiation box 54 in conjunction with the side location of the filter 48 will now be explained. Assume that the furnace 10 has been operating for several minutes so that the burners 12 and cells 16 have been heated up to their full operating temperature, and then assume that the electrical power to the furnace fails or is shut off. Immediately, the blower 46 stops and the cessation of electrical power closes the solenoid valve 100 to shut off the burners. Then, the hot air in the furnace which reverses its flow due to thermogravitational action rises into the heat trap and radiation box 54 and becomes trapped. The heat is safely dissipated from the exterior of this box 54 by radiation and convection. The filter 48 may contain numerous small flammable particles which have been filtered from the air. This filter is located low down on the side of the furnace and the heat trap box 54 safely isolates the filter 48 from the reverse flow of hot air upon furnace shut-off.

Figure 4:
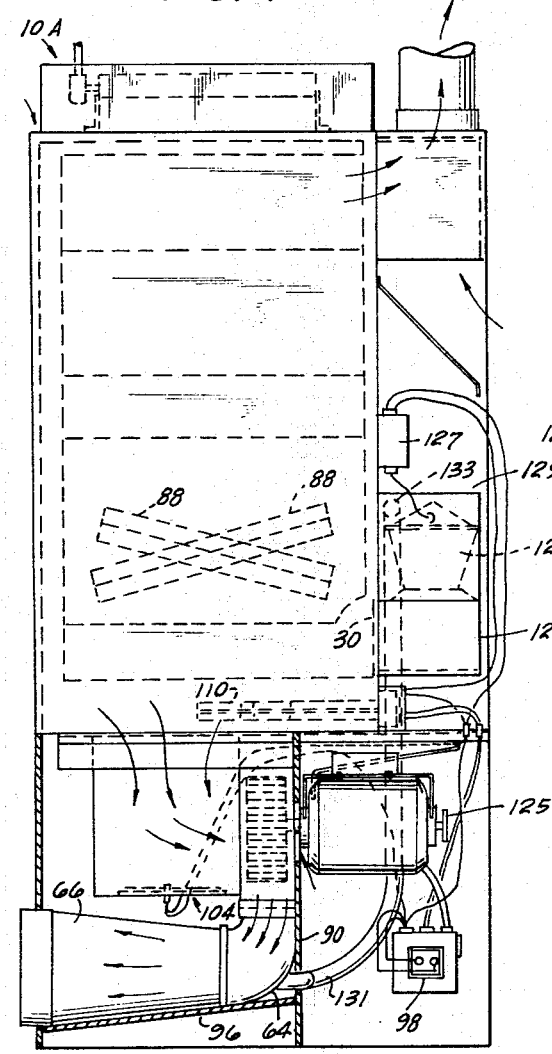
FIGURE 4 is a side elevational view of a modified embodiment of the furnace of FIGURES 1-3 and is adapted to be oil fired.
Figure 5:
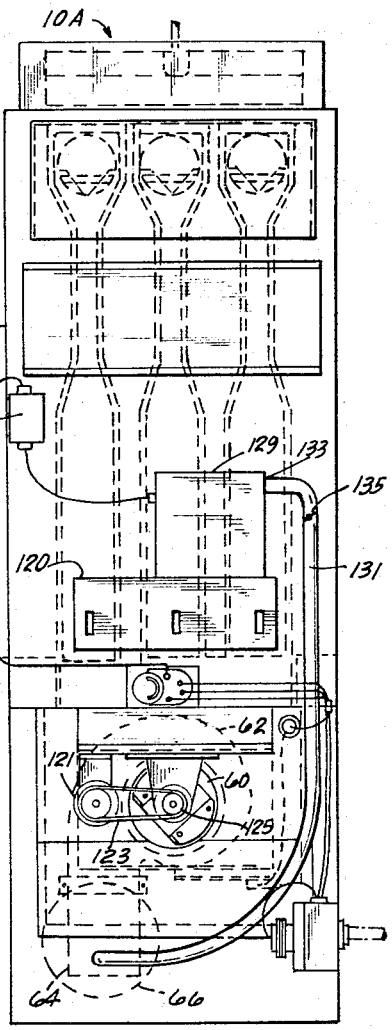
FIGURE 5 is a front elevational view of the furnace of FIGURE 4.

As shown in FIGURES 4 and 5, the modified embodiment of the high-temperature, high velocity furnace 10A is oil-fired. This furnace embodiment 10A is identical with the embodiment 10 of FIGURES 1-3, except that in the furnace 10A the three gas burner elements 12 and gas manifold 102 and solenoid valve 100 are replaced by an insulated fire-box manifold 120 which is connected to the inlet openings 30 and into the respective cells 16. A down-firing oil burner 122 of the small volume type is directed into the insulated fire-box manifold 120, for example, this oil burner may be of the double vortex type as described in U.S. Patent No. 2,736,168 to Hanley. The suction switch 104 serves to shut off the oil pump, ignition and blower of the oil burner 122 in the event the blower 122 is not operating.

As shown in FIGURE 5, the oil pump 121 is driven by a V-belt 123 from a pulley wheel 125 on the shaft of the motor 60. An ignition transformer 127 energizes ignition means for igniting the oil in the burner 122.

In order to provide air for combustion, the oil burner 122 is surrounded by a housing 129, and a duct 131 extends from the elbow 64 up to an inlet 133 in the housing 129. An adjustable air damper 135 is used to set the desired amount of combustion air flow into the housing 129 for optimum combustion conditions in the burner 122.

Figure 6:
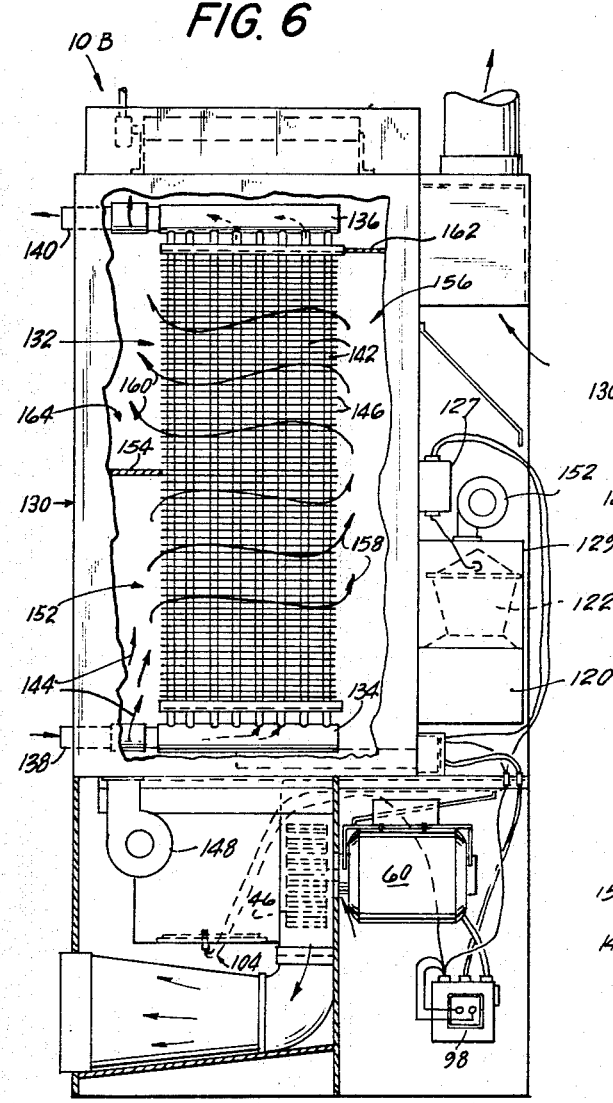
FIGURES 6 and 7 show a further modification of the furnace for heating hot water for domestic use.
Figure 7:
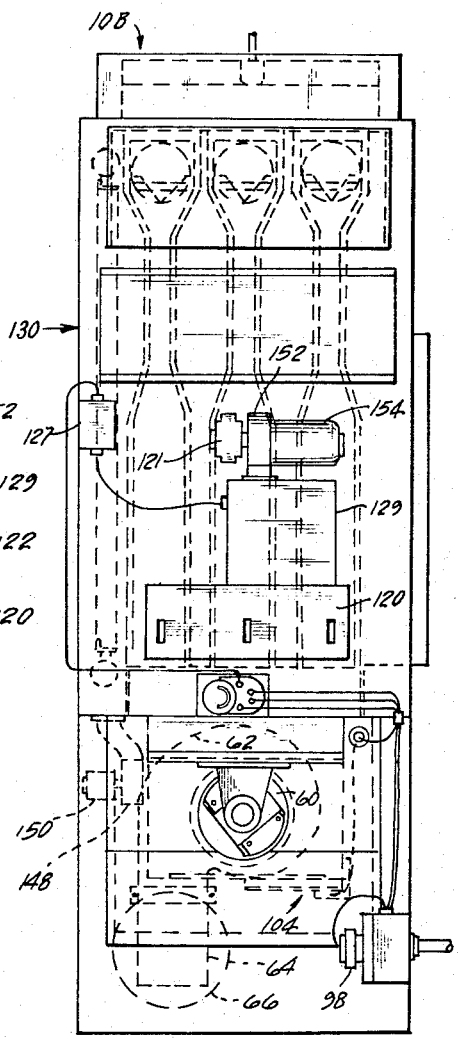

FIGURES 6 and 7 show a further modified high-temperature, high-velocity domestic heating furnace 10B including a hot-water heater 130 incorporated as an integral part of the furnace. This hot water heater 130 includes a heat exchanger 132 having a cold water header or manifold 134 extending across the bottom of the heat exchanger and hot water header or manifold 136 extending across the top.

The cold water manifold 134 is connected during installation through a pipe line 138 to an outlet circulation connection at or near the bottom of an insulated hot water storage tank as will be understood, and the hot water manifold 136 is connected through another pipe line 140 to another circulation connection on the hot water storage tank at a point higher than the cold connection point so that thermo-gravity circulation through the heat exchanger occurs as desired, as indicated by the flow arrows.

As hot water is withdrawn from the top of the storage tank for domestic service, for example, for bathing, laundry, dishwashing, and the like, water to be heated is fed into the bottom of the storage tank.

During operation when the water in the tank begins to cool off or whenever hot water has been used, circulation of the water by gravitation through the heater 130 quickly serves to replenish the supply of hot water in the tank.

The heat exchanger 132 includes a plurality of heat exchange tubes 142 extending vertically in parallel flow arrangement between the headers 134 and 136 and formed of material of high heat conductivity and corrosion resistance; for example, these are shown as being metal tubes formed of copper, brass, aluminum, or the like. A preferred construction is to make these tubes of copper. The thermo-gravity circulation discussed above forces the cooler water to flow from the header 134 upwardly in parallel circulation through all of the tubes 142. While the water rises through the tubes 142, it is rapidly and advantageously heated by high-velocity, high-temperature air 144 which is blown through the heat exchanger 132 in a direction generally transversely to the length of the tubes. A large number of closely spaced, parallel heat transfer fins 146 extend horizontally among the tubes 142 in good heat conductive relationship therewith. These fins 146 are formed of a material of high heat conductivity and in firm engagement with the material used to form the tubes 142 so as to provide good heat transfer. In this embodiment, the fins 146 are formed of aluminum. The hot air 144 from the suction plenum chamber 42 is blown horizontally betweens these fins 146 and passes around and among the tubes 142, which are arranged in staggered relationship in two parallel rows, thereby providing a large water flow capacity in a compact volume while accommodating a large flow of hot air transversely through the heat exchanger.

It is noted that both the gas-fired furnace 10 and the oil-fired furnace 10A may conveniently be modified to include the hot water heater 130. In order to provide the air flow 144 through the heater 130, a second blower 148 and motor 150 are associated with the plenum chamber 42, and the hot air passes from the blower 148 through a first vertical conduit 152 extending along one edge of the heat exchanger 132. This conduit 152 serves as the hot air inlet manifold for the hot water heat exchanger 132 and it extends up along one half of the total vertical length of the heat exchanger 132 and is closed off at its upper end by a barrier partition 154.

From the first manifold passage, the hot air 144 passes at high velocity transversely around the tubes 142 passing between the heat transfer fins 146 and surging around and among the tubes 142. Then, after this first transverse flow, the hot air enters a second vertically extending conduit 156, as indicated by the arrows 158. This second conduit 156 serves as the outlet manifold for the lateral air flow through the lower half of the heat exchanger 132 and also serves as the inlet manifold for a second lateral flow back through the upper half of this heat exchanger, as indicated by the arrows 160. The upper end of the second conduit 156 is blocked by a barrier 162 just below the hot water header 136.

A third vertical conduit 164, directly above the barrier 154 and in line with the first conduit 152, receives the transverse air flow 160. In order to complete this water heating air flow circuit back to the suction plenum 42, this third conduit 164 is connected into the upper end of one of the side chambers 52 on the side of the furnace opposite to that having the intake filter. Thus, it will be appreciated that this water heating air flow circuit is effective in delivering a large volume of hot air through the water heater and in returning this air to the suction plenum 42. In cases where the water is being heated, but there is no requirement for heating the rooms, then the blower 46 remains idle and the blower 148 is turned on when the burners are firing. The suction sensing switch 104 is actuated by operation of either blower 46 or 148 alone or by operation of both of them simultaneously.

In this furnace embodiment 10B in order to supply combustion air to the oil burner 122 for providing hot air 144 to the hot water heater 132 regardless of whether the house distribution blower 46 is operating, the duct 131 of the furnace 10A is omitted, and there is a third blower 152 and motor 154. This motor 154 is electrically connected so that the blower 152 is always operated whenever the burner is firing. The oil pump 121 is shown driven by the shaft of the motor 154.

It is to be noted that the waterheater and blower 148 may be omitted from the embodiment of FIGURES 6 and 7. In other words, this further embodiment is similar to that shown in FIGURES 4 and 5 except that the blower 152 and motor 154 are used to supply the combustion air instead of using the duct 131 of FIGURES 4 and 5.

As an alternative way to supply the combustion air for the furnace 10A or 10B, it is noted that an exhaust suction blower may be located downstream from the exhaust ports 34 and discharging into the exhaust duct 18. This exhaust suction blower draws air into the burner 122 and thus is used in lieu of the duct 131 in furnace 10A. In the furnace 10B this exhaust suction blower is used in lieu of the blower 152. An advantage of the use of such an exhaust suction blower is that the cells 16 are operated with their interior at subatmospheric pressure. Thus, if any leak should occur in the heat exchanger cells 16, the air being heated leaks into the subatmospheric pressure exhaust gases, which is a safe direction for the leakage to occur.

From the foregoing it will be understood that the mass-production, low-cost furnaces for supplying high-temperature, high-velocity air for domestic heating described herein as illustrative embodiments of the present invention are well suited to provide the advantages set forth and that all matter hereinbefore set forth or shown in the accompanying drawings is to be interpreted as illustrative and not in a limiting sense and that in certain instances some of the features of the invention may be used without a corresponding use of other features or may be modified into equivalent elements, all without departing from the scope of the invention as defined by the following claims.

I claim:

1. In a domestic hot air furnace for space heating, apparatus for providing high velocity air at an elevated temperature in the range from 250° F. to 375° F. comprising fuel burner means for providing hot gas products of combustion, means for providing combustion air to support the combustion, heat exchanger means including a plurality of walls surrounding said burner means and extending upwardly above said burner means for conducting the hot gases upwardly, exhaust duct means connected to the upper portion of said heat exchanger means for conducting away the gas products of combustion after their upward flow within the walls of said exchanger means, suction plenum chamber means positioned below said heat exchanger means, a blower having its intake communicating with said suction plenum chamber for maintaining the pressure within said suction plenum chamber below atmospheric pressure, a plurality of baffle walls in closely spaced relationship with respective exchanger walls for defining a plurality of narrow passages adjacent to said exchanger walls and for blocking off air flow through said furnace except through said narrow passages, said narrow passages each communicating at their lower ends with said suction plenum chamber, air inlet means including a filter for supplying air to the upper ends of said narrow passages, an outer jacket around said furnace, an insulation layer within said jacket and closely adjacent to said jacket providing a narrow cooling air space between said jacket and said insulation layer, the lower portion of said cooling air space communicating with said suction plenum chamber for drawing cooling air through said cooling space between said jacket and insulation layer for maintaining the casing of said furnace cool during operation.

2. In a domestic hot air furnace for space heating as claimed in claim 1 wherein said outer jacket is made of sheet metal panels having joints between said panels, said joints communicating with said narrow cooling air space between said jacket and insulation layer for drawing ambient temperature cooling air through the leakage points in the casing for cooling the jacket during operation.

3. In a domestic hot air furnace for space heating as claimed in claim 1, a heat trap and radiation box positioned at the top of said furnace with the interior of said box communicating with the upper ends of said narrow passages, said air inlet filter being positioned at the side of the furnace, one of said baffle walls defining an inlet chamber communicating with the interior of said heat trap and radiation box and also communicating with said filter for drawing air in through said filter at the side of the furnace and up into said box to enter said narrow passages.

4. In a domestic hot air furnace for space heating as claimed in claim 1 including movable a diaphragm means in said suction plenum chamber responsive to the differential between atmospheric pressure and the reduced pressure in said suction plenum chamber, and switch means controlled by said diaphragm means for shutting off said fuel burner means in the absence of said differential in pressure.

5. A domestic hot air space heating system for providing high velocity air at an elevated temperature in the range from 250° F. to 375° F. comprising fuel burner means for providing hot gas products of combustion, means for providing combustion air to support the combustion, heat exchanger means including a plurality of walls commencing near said burner means and extending upwardly above said burner means for conducting the hot gases upwardly, exhaust duct means connected to the upper portion of said heat exchanger means for conducting away the gas products of combustion after their upward flow within the walls of said exchanger means, suction plenum chamber means positioned below said heat exchanger means, an extended insulated distribution plenum duct and a plurality of small diameter insulated flexible ducts connected thereto at spaced points for supplying hot air to the rooms, a blower having its intake communicating with said suction plenum chamber for maintaining the pressure within said suction plenum chamber below atmospheric pressure and having its discharge connected to said distribution plenum duct, a plurality of baffle walls in closely spaced relationship with respective exchanger walls for defining a plurality of narrow passages adjacent to said exchanger walls and for blocking off air flow through said furnace except through said narrow passages, said narrow passages each communicating at their lower ends with said suction plenum chamber, air inlet means including a filter for supplying air to the upper ends of said narrow passages, control means for turning on said fuel burner and said blower means, and a pressure differential switch communicating said suction plenum chamber for turning off said fuel burner means in the absence of a pressure differential.

6. A domestic hot air space heating system as claimed in claim 5 wherein said fuel burner means is an oil burner, an insulated fire-box manifold connecting said oil burner to the lower portions of said heat exchanger means, and a combustion air supply duct extending from the discharge side of said blower to said oil burner for supplying combustion air thereto.

7. A domestic hot air space heating system as claimed in claim 6 and including a fuel oil pump driven by said blower for supplying oil to said oil burner.

8. A domestic hot air furnace for space heating for providing high velocity hot air at an elevated temperature in the range from 250° F. to 375° F. comprising fuel burner means for providing hot gas products of combustion, means for providing combustion air to support the combustion, heat exchanger means including a plurality of hollow sheet metal cells extending upwardly within the furnace and communicating with said burner means for conducting the hot gases upwardly, exhaust duct means connected to the upper portion of said heat exchanger means for conducting away the gas products of combustion after their upward flow within said hollow cells, suction plenum chamber means positioned below said hollow cells, a blower having its intake communicating with said suction plenum chamber for maintaining the pressure within said suction plenum chamber below atmospheric pressure, said blower having a discharge connection for supplying the high velocity hot air to the space to be heated, a plurality of baffle walls extending upwardly along near said cells in closely spaced relationship with the exterior surfaces of the cells for defining a plurality of narrow air-heating passages adjacent to said cells and for blocking off air flow through said furnace except through said narrow passages, said narrow passages each communicating at their lower ends with said suction plenum chamber, air inlet means including a filter for supplying air to the upper ends of said narrow passages, an outer jacket around said furnace, an insulation layer within said jacket and closely adjacent to said jacket providing a narrow cooling air space between said jacket and said insulation layer, the lower portion of said cooling air space communicating with said suction plenum chamber for drawing cooling air through said cooling space between said jacket and insulation layer for maintaining the casing of said furnace cool during operation.

9. A domestic hot air furnace as claimed in claim 8 and wherein said hollow sheet metal cells include indentations in their exterior surfaces, and said baffle walls closely conform to said exterior surfaces for defining said narrow air-heating passages extending along the full length of said cells and of substantially uniform narrow cross-sectional area along their full length for providing high-velocity air flow at all points therein.

10. A domestic hot air furnace for space heating as claimed in claim 8 and wherein one of said baffle walls defines an air inlet chamber extending upwardly along one side of the furnace and communicating with the upper ends of said narrow passages, and said air inlet filter is in said side of the furnace.

11. A domestic hot air furnace for space heating as claimed in claim 10 and including a hot water heater extending upwardly along a different side of the furnace from said air inlet filter, a second blower having its intake communicating with said suction plenum chamber and having its discharge communicating with said hot water heater for supplying hot air thereto, and the upper end of said hot water heater communicating with the upper ends of said air heating passages for returning the hot air thereto.

12. A domestic hot air space heating system as claimed in claim 5, wherein said fuel burner means is an oil burner, an insulated fire-box manifold connecting said oil burner to the lower portions of said heat exchanger means, a second blower connected to said oil burner for supplying combustion air thereto, and said control means controlling said oil burner and said second blower.

References Cited by the Examiner

UNITED STATES PATENTS

| 566,450 | 8/1896 | Edgar | 126—99 |
| 1,830,412 | 11/1931 | Stark | 126—99 |
| 2,137,581 | 11/1938 | Myler | 126—116 |
| 2,647,506 | 8/1953 | Heiman | 126—110 |
| 2,752,912 | 7/1956 | MacCracken | 126—110 |
| 3,090,374 | 5/1963 | Allen | 126—110 |

JAMES W. WESTHAVER, *Primary Examiner.*